United States Patent [19]

Miller et al.

[11] 4,239,838
[45] Dec. 16, 1980

[54] ENERGY CONVERSION DEVICE WITH IMPROVED SEAL

[75] Inventors: Gerald R. Miller, Salt Lake City; Anil V. Virkar, Midvale, both of Utah

[73] Assignee: Ford Motor Company, Dearborn, Mich.

[21] Appl. No.: 91,284

[22] Filed: Nov. 5, 1979

[51] Int. Cl.³ .............................................. H01M 2/00
[52] U.S. Cl. .................................... 429/104; 429/185
[58] Field of Search ................ 429/104, 174, 185, 429/176, 171, 172, 218, 173

[56] References Cited

U.S. PATENT DOCUMENTS

| | | | |
|---|---|---|---|
| 2,079,495 | 5/1937 | Deibel | 429/167 |
| 2,461,534 | 2/1949 | Ellis | 429/170 |
| 3,276,912 | 10/1966 | Pun | 429/168 |
| 3,514,332 | 5/1970 | Minck | 429/104 |
| 3,713,896 | 1/1973 | Feldhake | 429/174 |
| 3,754,997 | 8/1973 | Ralston | 429/168 |
| 3,770,502 | 11/1973 | Nakabayashi | 429/104 |
| 3,783,024 | 1/1974 | Gibson et al. | 429/104 X |
| 3,939,007 | 2/1976 | Sudworth et al. | 429/104 X |
| 3,964,932 | 6/1976 | Oltman et al. | 429/185 |
| 3,982,957 | 9/1976 | Jones et al. | 429/163 |
| 3,985,576 | 10/1976 | Lingscheit et al. | 429/103 |
| 4,006,281 | 2/1977 | Markin et al. | 429/103 |
| 4,024,321 | 5/1977 | Tilley | 429/104 |
| 4,029,858 | 6/1977 | Evans et al. | 429/104 |
| 4,048,393 | 7/1977 | Heintz et al. | 429/104 |
| 4,049,889 | 9/1977 | Heintz | 429/174 |
| 4,091,190 | 5/1978 | Heintz | 429/176 |

Primary Examiner—Anthony Skapars
Attorney, Agent, or Firm—Roger L. May; Olin B. Johnson

[57] ABSTRACT

An energy conversion device comprising an improved sealing member adapted to seal a cation-permeable casing to the remainder of the device. The sealing member comprises a metal substrate which (i) bears a nonconductive and corrosion resistant coating on the major surface to which said casing is sealed, and (ii) is corrugated so as to render it flexible, thereby allowing said member to move relative to said casing without cracking the seal therebetween. Corrugations may be circumferential, radial, or both radial and circumferential so as to form dimples. The corrugated member may be in form of a bellows or in a substantially flat form, such as a disc.

22 Claims, 7 Drawing Figures

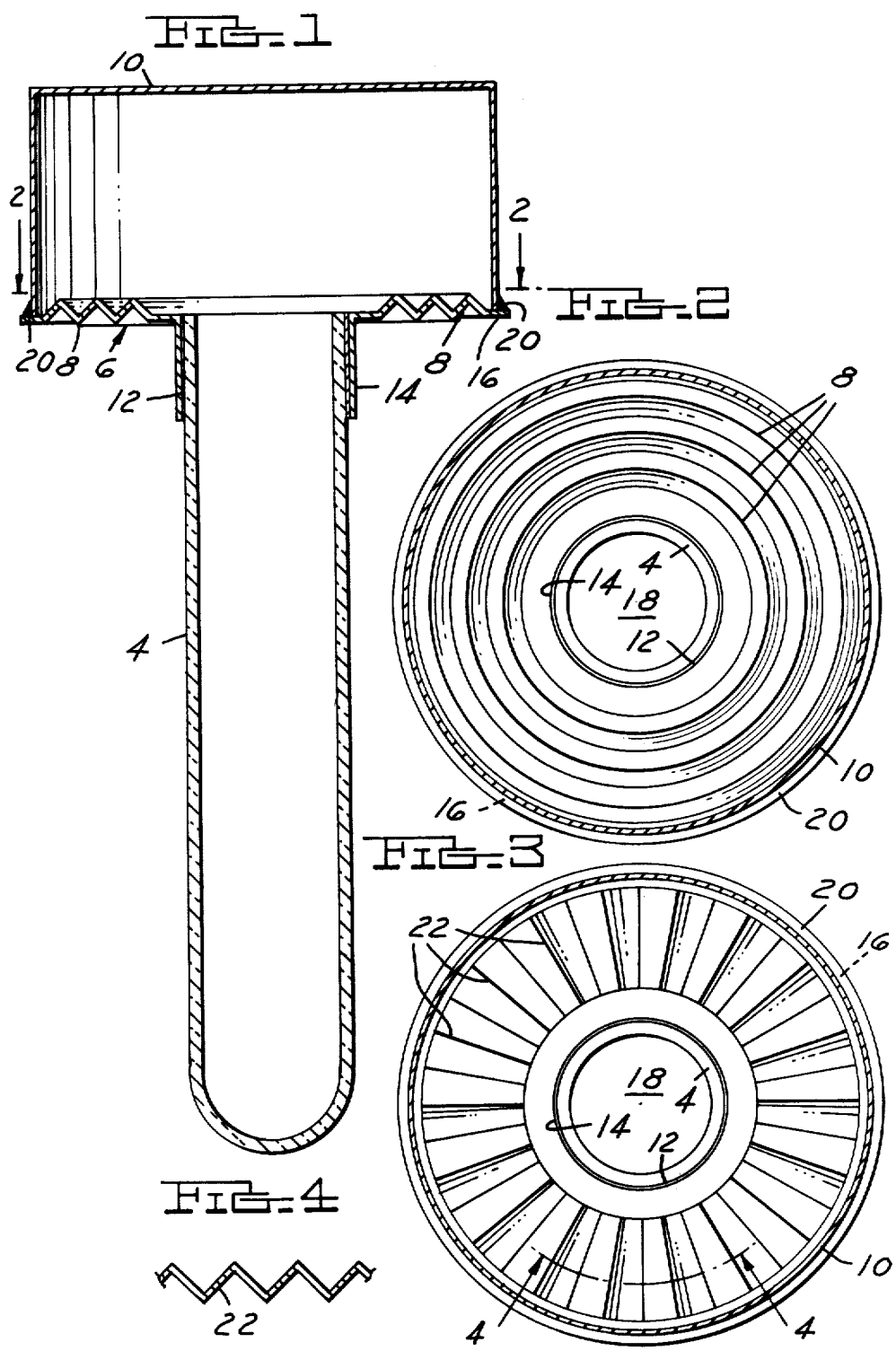

U.S. Patent    Dec. 16, 1980    Sheet 2 of 2    4,239,838
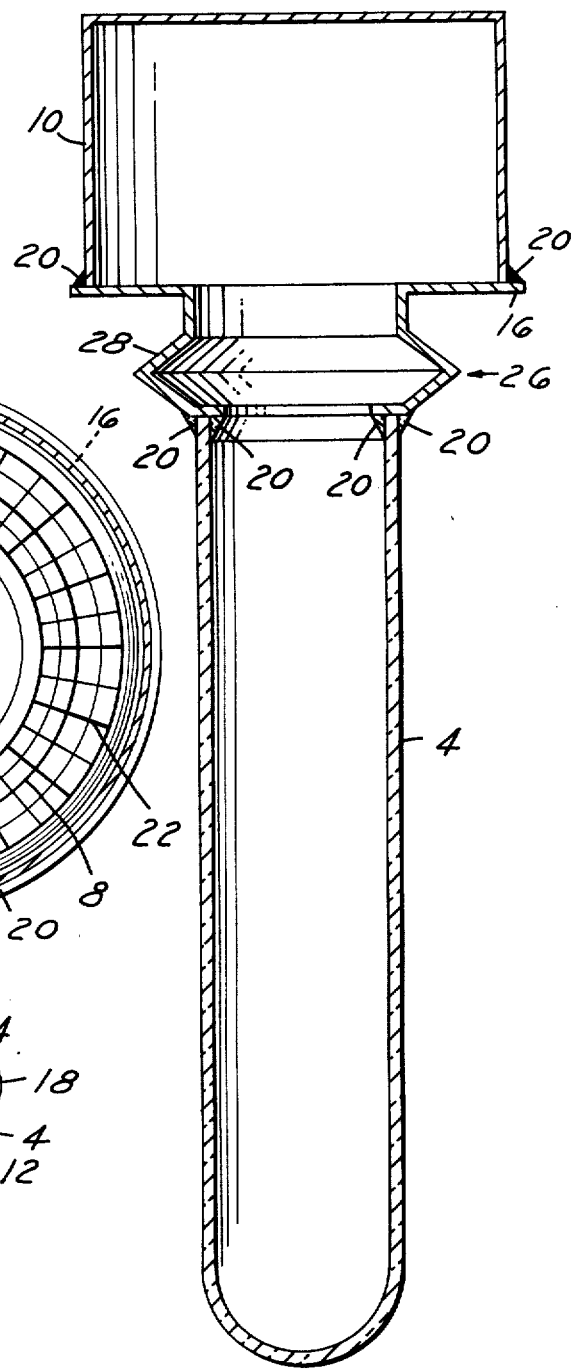
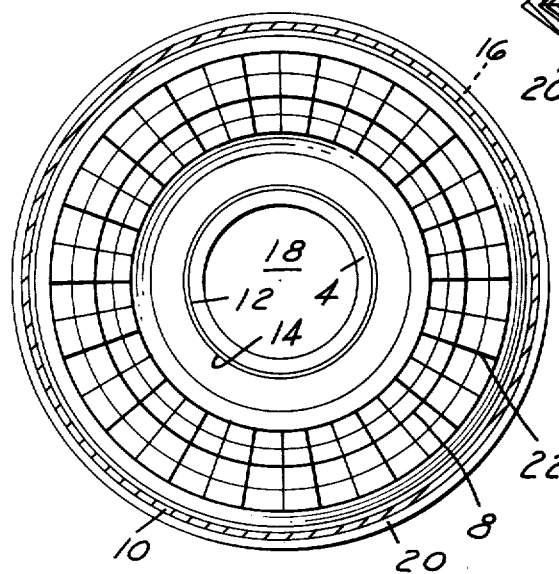
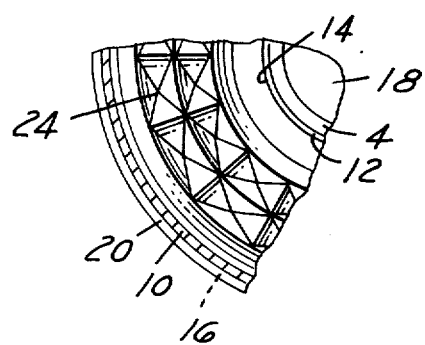

ENERGY CONVERSION DEVICE WITH IMPROVED SEAL

The invention described herein was made in the course of or under a contract or subcontract thereunder with the U.S. Department of Energy.

The invention described herein relates to an energy conversion device comprising an improved sealing member adapted to seal a casing, which is a cation-permeable barrier to mass liquid transfer, to the remainder of the energy conversion device.

BACKGROUND OF THE INVENTION

Numerous known energy conversion devices comprise a solid, cation-permeable casing which is a barrier to mass liquid transfer. In such devices, in order to attach the casing to the remainder of the cell or device, the casing is attached or sealed to a sealing member which, in turn, is attached to other components. Such energy conversion devices generally include anodic and cathodic reaction zones. The anodic reaction zone generally is bounded, at least in part, by a major surface of the casing, and, in preferred devices, contains molten alkali metal which serves as an anode-reactant and is in electrical contact with an external circuit. The cathodic reaction zone of such devices generally contains an electrode which is in electrical contact with both the cation-permeable casing and the external circuit. Also, this zone is bounded, at least in part, by the major surface of said casing opposite the major surface bounding the anodic reaction zone.

Among the numerous well known energy conversion devices falling within the above mentioned general class are: (1) primary batteries employing electrochemically reactive oxidants and reductants in contact with and on opposite sides of the cation-permeable casing; (2) secondary batteries employing molten electrochemically reversibly reactive oxidants and reductants in contact with and on opposite sides of the cation-permeable casing (e.g., the sodium sulfur battery); (3) thermoelectric generators wherein a temperature and pressure differential is maintained between anodic and cathodic reaction zones and/or between anode and cathode; and (4) thermally regenerated fuel cells.

Many electrical conversion devices discussed above and a number of materials suitable as cation-permeable casings are disclosed in the following exemplary U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531; 3,811,493; 3,985,576; 4,020,134; 4,048,393; 4,039,889; 4,084,041; and 4,091,190. All of the aforementioned patents are commonly assigned with this application.

In energy conversion devices of the type described above it is critical that the cation-permeable barrier be sealed to the remainder of the device in such a manner as to prevent both ionic and electronic current leakage between the two reaction zones of the device. This insulation insures that the ionic conduction takes place through the cation-permeable casing while the electronic conduction accompanying the chemical reaction follows the external shunt path, thus resulting in useful work. In those instances where one or more reservoirs for cell reactants are employed such that reactants may flow therefrom into a reaction zone created by the cation-permeable casing, it is of course necessary to seal both the casing and the reservoir with which it communicates in an insulative fashion.

In addition to providing necessary insulation, the seal of the cation-permeable casing to other cell components, (i) must support loads to which the casing may be exposed, (ii) should in no way introduce deleterious properties into the electrical conversion device, and (iii) must withstand a variety of environments varying both in temperature and corrosive nature. Thus, while long life and trouble-free operation of a high temperature energy conversion device such as a sodium sulfur battery depends on many factors, including durability of the solid electrolyte, corrosion resistance of the container, stress present in mating various components, etc., one of the most important factors relates to the sealing of the cation-permeable casing to other components of the cell.

Prior art seals for sealing cation-permeable casings to other components of an energy conversion device have been generally of two types. Both employ alpha-alumina ceramic. One of the designs involves use of alpha-alumina in the tubular form (see U.S. Pat. No. 3,985,576) while the other employs an alpha-alumina disc. In both prior art sealing techniques, the cation-permeable casing, such as the beta alumina tube which serves as a solid electrolyte for the sodium sulfur cell, is sealed to either the tube or the disc using a boro silicate glass. In the case of the tube-type seal, the assembly is then sealed to other parts of the battery using a glass seal. In the case of the disc, it is common to employ a mechanical compression seal.

While the prior art seals maintain a reasonably good resistance to attack by cell reactants, such as sodium, sulfur and sodium polysulfide, cell failure frequently occurs either at the seal or it can be traced to the seal area. Seal failure generally occurs during any one of the following stages: (1) cell assembly, (2) cell filling, (3) cell freezing and thawing, and (4) cell operation. Many failures are apparently due to residual stresses incorporated during sealing or stresses created during cell assembly. Misalignment strains occur to some extent and cannot be avoided. The problem becomes particularly critical when designing cells with long cation-permeable casings (e.g., beta-alumina tubes).

It is an object of the present invention to provide a sealing member which not only provides necessary insulation and support for the cation-permeable casing while providing a connecting means for assembling the cell, but also is more flexible so as to take up thermal and misalignment strains and thereby avoid failure of the cell as a result of seal failure.

BRIEF DESCRIPTION OF THE INVENTION

The seal assembly of the present invention overcomes many of the difficulties of the prior art sealing devices or designs. It is less expensive to manufacture since it eliminates the necessity for many stringent cell assembly requirements, including maintaining electrolyte dimensional tolerances and sealing alignment procedures. It also results in a cell having longer life, thereby removing operational constraints now inhibiting high temperature operation of energy conversion devices (e.g., operation of sodium-sulfur cells at temperatures above 300° C. for sustained periods of time in environments where the cells are exposed to misalignment strains which will be transmitted to the seal between the cation-permeable casing and the sealing member).

In accordance with the invention, the member to which the cation-permeable casing of an energy conversion device is sealed is a sealing member which comprises a metal substrate which (i) bears a nonconductive and corrosion resistant surface coating on the major surface to which said casing is sealed and (ii) is corrugated so as to render it flexible, thereby allowing the member to move relative to the casing without cracking the seal therebetween. Corrugations may be circumferential, radial, or both circumferential and radial so as to form dimples on the surface of the member. The corrugated member may be in the form of bellows or it may be substantially flat (e.g., in disc form).

The invention will be more fully understood from the following detailed description of the invention when read in view of FIGS. 1–7 of the drawings.

FIG. 1 is a vertical sectional view of a portion of an energy conversion device, showing a tubular cation-permeable ceramic casing sealed in the manner of the improvement of the invention to a reservoir.

FIG. 2 is a sectional view of the assembly of FIG. 1 taken along line 2—2.

FIG. 3 is a sectional view of an assembly such as shown on FIG. 1, but showing a modified sealing member of the invention.

FIG. 4 is a fragmentary sectional view taken along line 4—4 of FIG. 3.

FIG. 5 is still another sectional view of an assembly such as shown in FIG. 1, but with still another modified seal member of the invention.

FIG. 6 is a fragmentary section of the device of FIG. 5.

FIG. 7 shows an assembly comprising a tubular cation-permeable casing and a reservoir sealed with still another form of sealing member of the invention.

DETAILED DESCRIPTION OF THE INVENTION

As discussed above, in accordance with the improvement of the invention, the sealing member which is sealed to and supports the cation-permeable casing of the energy conversion device comprises a metal substrate which (i) bears a nonconductive and corrosion resistant surface coating on at least the major surface to which the cation-permeable casing is sealed and (ii) is corrugated so as to render it flexible, thereby allowing the member to move relative to the cation-permeable casing without cracking the seal between the casing and the sealing member.

The corrugations may be circumferential, radial, or both circumferential and radial such that dimples are formed on the surface of sealing member. This latter design is preferred. Corrugations in the sealing member lower the compliance of the member significantly, thus making it act like a spring. Hence, any misalignment strains are taken up by the flexible sealing member. Thus, strains and corresponding stresses transmitted to the cation-permeable casing are minimal.

The sealing member may be substantially flat. For example, it may be a disc having an opening in the center thereof which corresponds to the open end of a cation-permeable casing to be sealed to and supported by the disc. Also, the sealing member may be a bellows shape, such that still further flexibility is afforded the sealing member.

In order to provide corrugations in the sealing member substrate, such as by punching or pressing using molds, it is necessary that the substrate be of a material which can be easily conformed. Therefore, the substrate is formed from metal. Preferred metals are those selected from (i) steels, (ii) stainless steel, (iii) titanium, (iv) titanium alloys, (v) homologs of titanium, (vi) alloys of said homologs of titanium, and (vii) alloys containing nickel, iron or chromium, or mixtures thereof (e.g., Inconel).

Because of the environment to which sealing member is exposed (e.g., sodium polysulfide), it must also be corrosion resistant. The aforementioned metals would not adequately withstand the corrosivity of reactants used in the energy conversion devices to which the invention applies. Therefore, it is necessary to provide the sealing member substrate with a corrosion resistant surface coating. Also, the surface coating must be insulating in nature such that the seal does not allow electronic current leakage between the two reaction zones of the energy conversion device (e.g., between the alkali metal in the anodic reaction zone and alkali metal reservoir of a sodium sulfur battery and the cathodic reaction zone). Numerous coatings which will provide necessary electronic insulation and corrosion protection will be apparent to those skilled in the art.

Among the numerous suitable coatings are oxide coatings such as chromium oxide, aluminum oxide, zirconium oxide, titanium dioxide, tantalum oxide, Niobium oxide and various titanates. These oxide coatings can be applied to the metal as oxides or they can be applied as metals which are then oxidized. In the case where oxides are applied directly, they typically may be applied using known sputtering or flame spray techniques. If the metal is put on prior to oxidizing, it may be applied by techniques such as by plating, flame spraying, dipping, vapor deposition, etc.

Other insulating and corrosion resistant coatings which may be employed are glassy silicates, and high temperature polymer coatings such as polyphenylenes, polyamides, polyimides, polyamidimides and polyquinoxalines. These may be applied as polymers or they may be polymerized on the metal surface.

In any case, the thickness of coatings applied should be sufficient to provide necessary electronic insulation and corrosion resistance, but not so thick as to result in spalling of the coating surface. The coating should be applied on at least the surface to which the cation-permeable casing is to be sealed. This generally is the surface exposed to the cathodic reactants of the cell. Of course, the coating may be applied to all surfaces of the sealing member. If, for example, the energy conversion device is a sodium sulfur battery with a sodium reservoir disposed above the cell, it is only necessary to have the bottom surface of the sealing member, which is exposed to the sodium polysulfide of the cathodic reaction zone, coated with the insulating and corrosion resistant material.

In general, the coatings employed must be non-conductive, corrosion resistant and sufficiently flexible so as to allow such flexing of the sealing member as will occur during preparation and operation of the cell. In those cases where the coating is applied prior to the time that the sealing member is corrugated, the coating material should be sufficiently flexible to allow deformation of the surface without cracking. A particularly suitable coated sealing member for use in accordance with the invention comprises a substrate of metal which is first coated with aluminum (such as by flame spraying, vapor deposition, etc.) and then corrugated, prior to being anodized to form a layer of aluminum oxide on the surface.

Referring now more specifically to FIG. 1, there is shown a subassembly of an energy device in which a cation-permeable casing in tubular form 4 is sealed to and supported by a sealing member shown generally at 6 in the form of a disc. The disc is shown as having three circumferential corrugations 8. FIG. 1 exemplifies the first of two preferred procedures for sealing disc 6 to tubular barrier 4. That procedure involves compression or press fitting of disc 6 onto tube 4. The flexible disc which may be, for example, stainless steel, having been corrugated and anodized (or flame sprayed or coated with, for example, polyphenylene) has an inner sleeve 14 which extends downward at the opening provided in the center thereof. Sleeve 14 is adapted to slip over the open end of tube 4. The end of tube 4 to be disposed contiguously to sleeve 14 is first flame sprayed with aluminum. Disc 6 is pressed over the flame sprayed surface of tube 4 such that sleeve 14 fits tightly thereover. Subsequently, the flame sprayed portion, as well as sleeve 14 may be anodized to form an impervious, insulating joint. Alkali metal reservoir 10 is shown attached to disc 6 by glass seal 20. The glass preferred for such a seal is a borosilicate glass formed from about 6 to 11 weight percent sodium oxide, about 41 to 51 weight percent silicon dioxide, and about 53 to 59 weight percent boron trioxide. Such borosilicate glasses have a number of properties making them well suited for use in sealing components in electrical conversion devices. These properties include: (1) reasonably good chemical stability to liquid alkali metals, sulfur and various polysulfides at above 300° C.; (2) good wetting to, but limited reactivity with, alumina ceramics; (3) a thermal expansion coefficient closely matched to both alpha and beta alumina ceramics; (4) easy formability with good fluid properties at low strain, annealing and melting temperatures; and (5) low electrical conductivity and hence small diffusion coefficients.

The outer rim of disc 6 must be connected to the outer container or can used to hold the cell. (For standard cell design with sodium inside casing 4 in a sodium sulfur battery cell.) Sealing to the outer can may be accomplished in several ways. These include: (a) mechanical sealing wherein disc 6 is compression sealed using aluminum gaskets with flanges and bolts; (b) glass sealing wherein disc 6 is sealed to the outer can using the borosilicate glass discussed above; and (c) compression fitting with radial compression wherein disc 6 is made thicker at its periphery with a thin coating of polyphenylene. Various techniques for sealing to an outer can of an energy conversion device such as a sodium sulfur battery are well known to those skilled in the art.

FIG. 2 shows a cross section of the subassembly of FIG. 1 taken along line 2—2. FIG. 3 shows a similar cross section of a subassembly, with the difference being that corrugations 20 of FIG. 3 are radial as opposed to the circumferential corrugations 8 of FIG. 2. As is shown in each case, a hole 18 is centrally located in the disc. This hole is sized so as to accommodate the end of tube 4. Numerals appearing in these Figures correspond to numerals used to describe the various parts in FIG. 1 and should be self-explanatory. Note that numeral 10, as in FIG. 1, is an alkali metal reservoir and numeral 16 depicts the rim of the disc which extends beyond the outside of the reservoir. This rim may extend to a greater or lesser extent depending upon the manner in which disc 6 is to be sealed to the outer can of the energy conversion device.

FIG. 4 merely shows a fragmentary section of the disc of FIG. 3.

FIG. 5 shows a similar cross sectional view with the exception that corrugations run in both directions. Circumferential corrugations are shown at 8 and radial corrugations at 22. The result of the corrugations in both radial and circumferential directions is the formation of dimples 24 shown in the fragmentary view of FIG. 6.

FIG. 7 shows another subassembly for use in energy conversion devices to which the improvement of the invention applies. In this embodiment tubular casing 4 is sealed to and supported by a sealing member (shown generally at 26) which is formed in the shape of a bellows as at 28. This sealing member is shown as sealed to both alkali metal reservoir 10 and tubular casing 4 by borosilicate glass 20.

Based upon the foregoing description of the invention what is claimed and desired to be protected by Letters Patent is:

1. In an energy conversion device comprising a cation-permeable casing, which is a barrier to mass liquid transfer, sealed to and supported by one surface of a member, wherein the improvement consists essentially of said sealing member comprising a metal substrate which (i) bears a non-conductive and corrosion resistant coating on the major surface to which said casing is sealed and (ii) is corrugated so as to render it flexible, thereby allowing said member to move relative to said casing without cracking the seal therebetween.

2. A device in accordance with claim 1, wherein corrugations in said substrate are circumferential.

3. A device in accordance with claim 1, wherein corrugations in said substrate are radial.

4. A device in accordance with claim 1, wherein corrugations in said substrate are both circumferential and radial, thereby forming dimples on the surface of said member.

5. A device in accordance with claim 1, wherein said metal substrate is selected from (i) steels, (ii) stainless steel, (iii) titanium, (iv) titanium alloys, (v) homologs of titanium, alloys of said homologs of titanium, and (vi) alloys containing nickel, iron or chromium or mixtures thereof.

6. A device in accordance with claim 5, wherein said coating is an insulating metal oxide.

7. A device in accordance with claim 5, wherein said coating is an insulating glassy silicate.

8. A device in accordance with claim 5, wherein said coating is an insulating high temperature polymer selected from polyphenylenes, polyamides, polyimides, polyamidimides, and polyquinoxalines.

9. A device in accordance with claim 1, wherein said metal substrate is stainless steel and said coating is aluminum oxide.

10. A device in accordance with any one of claims 1, 2, 3, 4, 5, 6, 7, 8 or 9, wherein said member is a bellows.

11. A device in accordance with any one of claims 1, 2, 3, 4, 5, 6, 7, 8 or 9, wherein said member is substantially flat.

12. A device in accordance with any one of claims 1, 2, 3, 4, 5, 6, 7, 8 or 9, wherein said member is a disc.

13. An energy conversion device comprising:
(A) A cation-permeable casing which is a barrier to mass liquid transfer;
(B) An anodic reaction zone which (i) contains molten alkali metal anode-reactant in electrical contact with an external circuit, and (ii) is bounded at least in part by a major surface of said casing;

(C) A cathodic reaction zone which (i) is bounded at least in part by the major surface of said casing opposite the major surface bounding said anodic reaction zone; and (ii) contains an electrode which is in electrical contact with both said casing and said external circuit; and (D) A sealing member, which seals said casing to the remainder of said energy conversion device, said sealing member comprising a metal substrate which (i) bears a nonconductive and corrosion resistant coating on the major surface to which said casing is sealed; and (ii) is corrugated so as to render it flexible, thereby allowing said member to move relative to said casing without cracking the seal therebetween.

14. A device in accordance with claim 13, wherein corrugations in said substrate are circumferential.

15. A device in accordance with claim 13, wherein corrugations in said substrate are radial.

16. A device in accordance with claim 13, wherein corrugations in said substrate are both circumferential and radial, thereby forming dimples on the surface of said member.

17. A device in accordance with any one of claims 13, 14, 15 or 16, wherein said member is a bellows.

18. A device in accordance with any one of claims 13, 14, 15 or 16, wherein said member is flat.

19. A device in accordance with any one of claims 13, 14, 15 or 16, wherein said member is a disc.

20. A device in accordance with claim 13, wherein said casing is tubular.

21. A device in accordance with claim 20, wherein said tubular casing has an open end and said sealing member has an opening therein corresponding to the open end of said casing, said casing and sealing member being position in sealed engagement such that the open end of said tube is aligned with said opening in said member.

22. A device in accordance with claim 21, wherein said anodic reaction zone is disposed interiorly of said casing, said cathodic reaction zone is disposed exteriorly of said casing, and a reservoir for said molten alkali metal is disposed such that said molten alkali metal may flow from said reservoir through said opening in said sealing member into said anodic reaction zone.

* * * * *